United States Patent
Malik et al.

(10) Patent No.: US 8,180,153 B2
(45) Date of Patent: *May 15, 2012

(54) 3+1 LAYER MIXED RASTER CONTENT (MRC) IMAGES HAVING A BLACK TEXT LAYER

(75) Inventors: Amal Malik, Pittsford, NY (US); Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 748 days.

This patent is subject to a terminal disclaimer.

(21) Appl. No.: 12/328,973

(22) Filed: Dec. 5, 2008

(65) Prior Publication Data

US 2010/0142820 A1  Jun. 10, 2010

(51) Int. Cl.
*G06K 9/34* (2006.01)
*G06K 9/00* (2006.01)

(52) U.S. Cl. .................................................. 382/176

(58) Field of Classification Search .............. 382/164, 382/167, 169, 170, 173, 176, 254, 260, 274, 382/275; 345/147, 600–604; 358/1.9, 2.1, 358/3.26, 455, 462, 464
See application file for complete search history.

(56) References Cited

U.S. PATENT DOCUMENTS

| | | | |
|---|---|---|---|
| 6,198,845 B1 | 3/2001 | Tse et al. | |
| 6,633,670 B1 | 10/2003 | Matthews | |
| 6,674,899 B2 | 1/2004 | Nagarajan et al. | |
| 6,992,686 B2 | 1/2006 | Nagarajan | |
| 7,058,222 B2 | 6/2006 | Li et al. | |
| 7,236,641 B2 | 6/2007 | Curry et al. | |
| 7,242,802 B2 | 7/2007 | Curry et al. | |
| 7,302,097 B2 | 11/2007 | Bai et al. | |
| 7,307,760 B2 | 12/2007 | Jacobs et al. | |
| 7,366,357 B2 | 4/2008 | Curry et al. | |
| 7,376,272 B2 | 5/2008 | Fan et al. | |
| 7,403,661 B2 | 7/2008 | Curry et al. | |
| 2004/0096102 A1 | 5/2004 | Handley | |
| 2006/0104512 A1 | 5/2006 | Hayashi et al. | |
| 2007/0253620 A1 | 11/2007 | Nagarajan et al. | |
| 2007/0280551 A1 | 12/2007 | Oztan et al. | |
| 2010/0142806 A1* | 6/2010 | Malik et al. | 382/164 |
| 2010/0142820 A1* | 6/2010 | Malik et al. | 382/176 |
| 2011/0026814 A1* | 2/2011 | Nuuja et al. | 382/164 |
| 2011/0069885 A1* | 3/2011 | Malik et al. | 382/176 |

OTHER PUBLICATIONS

Rafael C. Gonzalez et al., Digital Image Processing, Addison-Wesley Publishing Company, 1992, pp. 518-565.

* cited by examiner

*Primary Examiner* — Amir Alavi
(74) *Attorney, Agent, or Firm* — Pillsbury Winthrop Shaw Pittman LLP

(57) ABSTRACT

A method, system and data structure for providing a 3+1 layer MRC image, including a black text layer. The black text layer includes pixel data corresponding to black text in an image and may be assigned a predetermined value for the color of black. According to one or more embodiments, using thresholding processing along with various morphological operations, the black text layer may be generated.

18 Claims, 6 Drawing Sheets

3+1 LAYER MIXED RASTER CONTENT (MRC) IMAGES HAVING A BLACK TEXT LAYER

FIELD

This application generally relates to mixed raster content (MRC) images, and in particular, having a black text layer.

BACKGROUND

Scanning and exporting color images to a network has started to become one of the standard features offered by digital multifunction devices. File size of a color image is an important factor while exporting color images. In addition to offering different resolutions, different compression schemes are being offered to reduce the file size of the color image that needs to be exported. One of the popular compression/file formats that are currently being offered is Mixed or Multiple Raster Content (MRC) representation.

The MRC representation of documents is versatile. It provides the ability to represent color images and either color or monochrome text. The MRC representation enables the use of multiple layers or "planes" for the purpose of representing the content of documents. The MRC representation is becoming increasingly important in the marketplace. It has been already established as the main color-fax standard. It is also offered as a selection in the Scan-to-Export feature, for example, in digital multifunction devices.

FIG. 1 shows one exemplary embodiment of a three-layer mixed raster content image data. As shown in FIG. 1, a document image 100 to be rendered using the mixed raster content format is generated using a background layer 110, a selector layer 120, and a foreground layer 130. A fourth, non-image data layer (not shown) may also be included in the mixed raster content image data file. The fourth layer often contains rendering hints which can be used by a rendering engine, such as Adobe® Acrobat®, to provide additional instructions on how particular pixels are to be rendered.

As shown in FIG. 1, the selector layer 120 is used to mask undifferentiated regions of color image data stored on the foreground layer 130 onto the background layer 110 to form the rendered image 100. In particular, the selector layer 120 contains high spatial frequency information for regions otherwise having slowly changing color information. In effect, regions whose color changes relatively slowly, if at all, are placed onto the foreground layer 130. In some MRC models, the foreground layer may also include color information regarding the pictorial regions. The shapes of those regions are then embedded into the selector layer 120. In contrast, regions having high color frequency, e.g., colors whose values change more significantly over very small spatial extents, are stored as continuous tone image data on the background layer 110. When the image represented by the data structure 100 is to be rendered or otherwise generated, the color information stored in the foreground layer 130 has spatial or shape attributes applied to it based on the binary information stored in the selector layer 120 and the resulting shaped color information is combined onto the background layer 110 to form the reconstructed layer 100.

An N-layer MRC model is also known, in which the foreground layer is separated into various independent sublayers. Each of the foreground sublayers is typically binarized having a specific color.

Black text typically accounts for 90% of office documents. One problem with the conventional three-layer MRC and N-layer MRC models is that black text is not always pure black since it is part of the foreground layer which takes color information directly from the original images. Attempts have been make to push black text towards pure black in the foreground layer. However, this may cause poor image quality in dark pictorial regions of the image, since the foreground layer does not differentiate between black text and black non-text pixels.

SUMMARY

According to one embodiment of this disclosure, a method for processing image data is provided, comprising: providing input image data; segmenting the input image data to generate: a background layer representing the background attributes of an image; a selector layer for identifying one or more foreground attributes of the image not included in the background layer; and a foreground layer representing the foreground attributes of the image; generating a black text layer comprising pixel data representing black text in the input image data; assigning the black text pixel data a predetermined value for the color black; and integrating the background layer, the selector layer, the foreground layer, and the black text layer into a data structure having machine-readable instructions that may be stored in a memory device.

According to another embodiment of this disclosure, a system for processing image data is provided, comprising: an image segmentor configured to receive image data and to generate a background layer representing the background attributes of an image; a selector layer for identifying one or more foreground attributes of the image not included in the background layer; and a foreground layer representing the foreground attributes of the image; a black text layer generating unit configured to determine pixel data representing black text in the input image data and to assign a predetermined color of black to the black text pixel data; and an integrating unit configured to integrate the background layer, the selector layer, the foreground layer, and the black text layer into a data structure having machine-readable instructions that may be stored in an memory device.

According to yet another embodiment of this disclosure, a data structure has machine-readable instructions stored in a memory device that when executed by a processor render an image. The data structure comprises: a background layer representing the background attributes of an image; a selector layer for identifying one or more foreground attributes of the image not included in the background layer; a foreground layer representing the foreground attributes of the image; and a black text layer comprising pixel data representing black text in the image, wherein the black text pixel data corresponds to a predetermined value for the color black.

Other features of one or more embodiments of this disclosure will seem apparent from the following detailed description, and accompanying drawings, and the appended claims.

BRIEF DESCRIPTION OF THE DRAWINGS

Embodiments of the present disclosure will now be disclosed, by way of example only, with reference to the accompanying schematic drawings in which corresponding reference symbols indicate corresponding parts, in which.

DETAILED DESCRIPTION

According to an aspect of this disclosure, a methodology is provided for generating a mixed or multiple raster content data (MRC) structure having a black text layer. The black text layer includes pixel data corresponding to black text in an image that may be assigned a predetermined value for the color black. The addition of the black text layer not only improves text quality, but may also provide opportunities for file size reduction (i.e., data compression).

This application relates to subject matter similar to that disclosed in co-pending U.S. patent application Ser. No. 12/329,078, entitled "3+1 LAYER MIXED RASTER CONTENT (MRC) IMAGES HAVING A TEXT LAYER AND PROCESSING THEREOF,". filed Dec. 5, 2008, herein incorporated by reference in its entirety.

Figure 2:
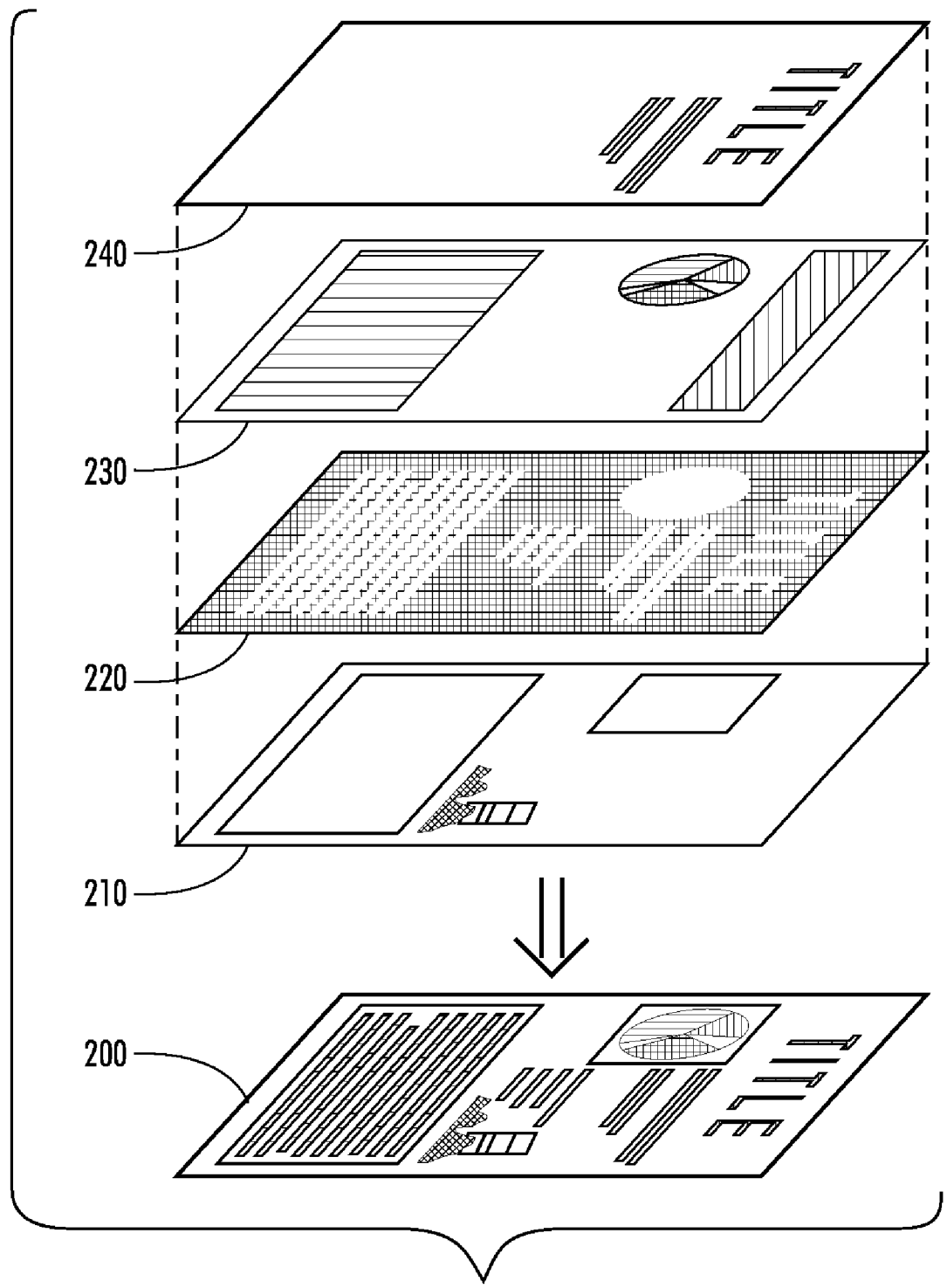
FIG. 2 shows an exemplary 3+1 layer MRC data structure, according to one embodiment of this disclosure.

FIG. 2 shows an exemplary 3+1 layer mixed or multiple raster content (MRC) data structure 200, according to one embodiment of this disclosure.

The data structure 200 may represent an image, for example, a digital file or a scanned document, which may include a plurality of image layers (or planes) that represent aspects of the image. As shown in FIG. 2, the data structure 200 generally includes four layers: background 210, selector 220, foreground 230 and black text 240.

Figure 1:
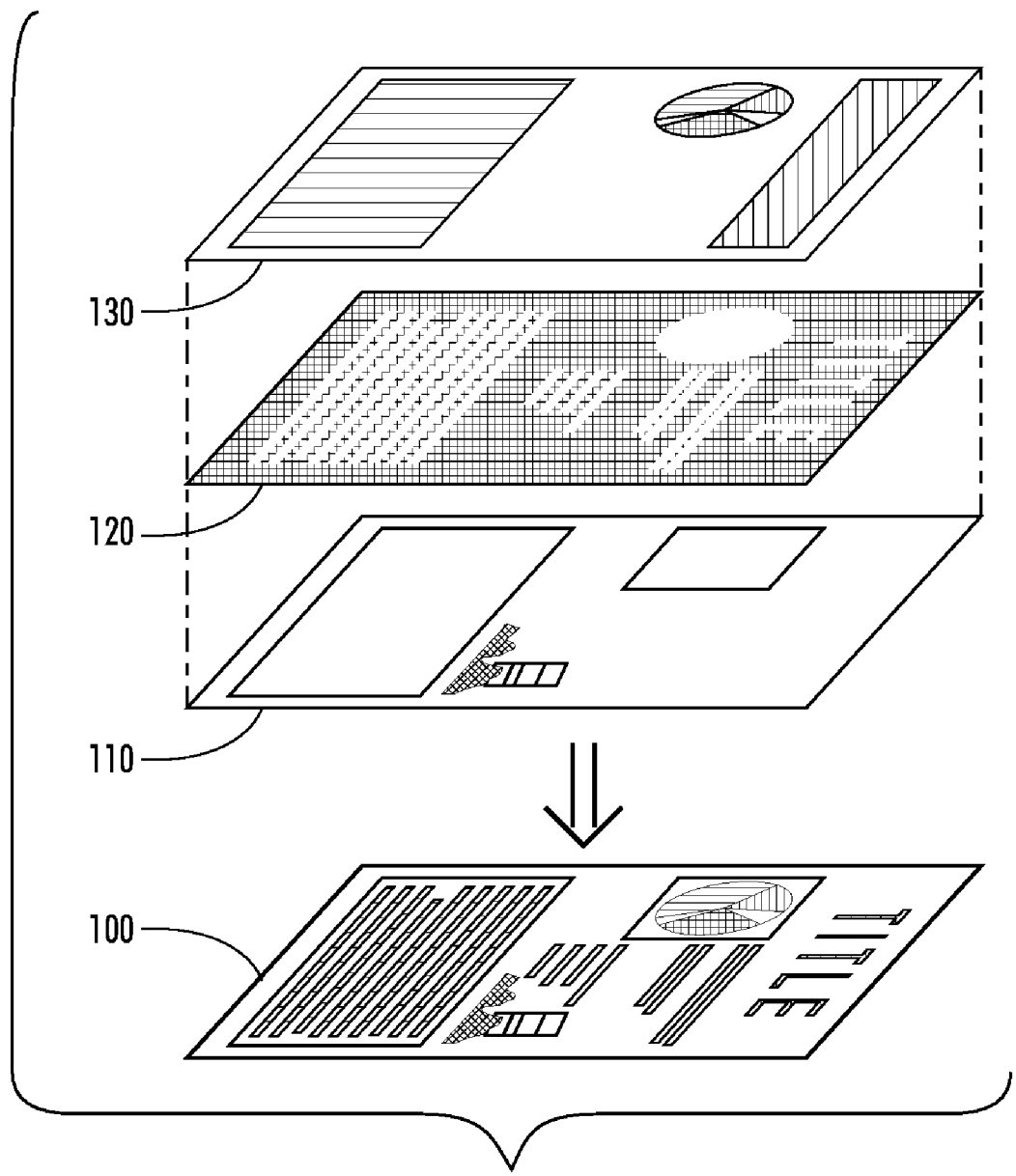
FIG. 1 shows a conventional three-layer mixed or multiple raster content (MRC) data structure.

The background 210, selector 220, foreground 230 layers may, in some circumstances, be similar to those in a 3-layer MRC data structure (see FIG. 1).

The background layer 210 may be used for representing the background attributes of an image. For example, the background layer 210 may hold color information corresponding to halftone images.

The selector layer 220 may be used for identifying one or more foreground attributes of the image not included in the background layer 210. For example, the selector layer 220 may hold text as well as edge information (e.g., line art drawings).

The foreground layer 230 may be used for representing the foreground attributes of the image. For example, the foreground layer 230 may hold the color information corresponding to the corresponding text and/or line art found in the selector layer 220. In some implementations, the foreground layer 230 may also include the color information regarding the pictorial content of the image.

The black text layer 240 may include pixel data corresponding to black text in the image. The black text pixel data may be assigned or otherwise associated with a predetermined value for the color black. In one implementation, this predetermined value may correspond to a "true" color of black.

The data structure 200 may also include one or more additional layers. For example, a rendering hints layer (not shown), may be used for communicating additional information about the content of the document. For example, the rendering hints layer may carry the ICC (International Color Consortium) color hints that identify the best color matching strategy for the various objects on the page.

Computers and other electronic equipment typically render color in three-dimensional (3-D) coordinates such as RGB. Many image printing systems, on the other hand, print in either three-dimensional colorant space, cyan, magenta, yellow (CMY) or four-dimensional colorant space, cyan, magenta, yellow, and black (CMYK) which can be derived from the input values, e.g., RGB.

A device independent color space may be used as an intermediate representation of the input image. A device independent space, such as a luminance-chrominance space, denoted generically as $LC_1C_2$ may be used. The L component represents luminance or lightness, and $C_1$ and $C_2$ are the two chrominance coordinates representing red-green and yellow-blue variations, respectively. Examples of a luminance-chrominance space representations are L*a*b*, or YCbCr, etc. Typically, each of the luminance, and chrominance space representations are 8-bit pixel data (i.e., values ranging from 0-255). Although, it will be appreciated that higher and lower bit level data may similarly be used.

Translations may be used to derive $LC_1C_2$ from input RGB, and from $LC_1C_2$ to image printing system colorant space. In other words, if the image is in an RGB space, it is typically first converted to such a luminance-chrominance representation for simplicity of edge calculation. The particular luminance-chrominance representation used is not limiting, and any representation may be used.

In some embodiments, the background layer 210 and foreground layer 230 may be multi-level (grayscale), while the selector layer 220 and black text layer 240 may be bi-level. For example, the background layer 210 and foreground layers 230 may be used for storing continuous-tone (i.e., contone) information, such as the background layer 210 representing background attributes of an image, like pictures and/or smoothly varying background colors. Whereas the foreground layer 210 would represent the color information of the text and line art, and in some MRC models, the color information of the pictorial content of the image. The selector layer 220 may be defined as a binary (1-bit deep) layer. The black text layer 240 may be binary or contone data. The optional rendering hints layer may used contone data.

Figure 3:
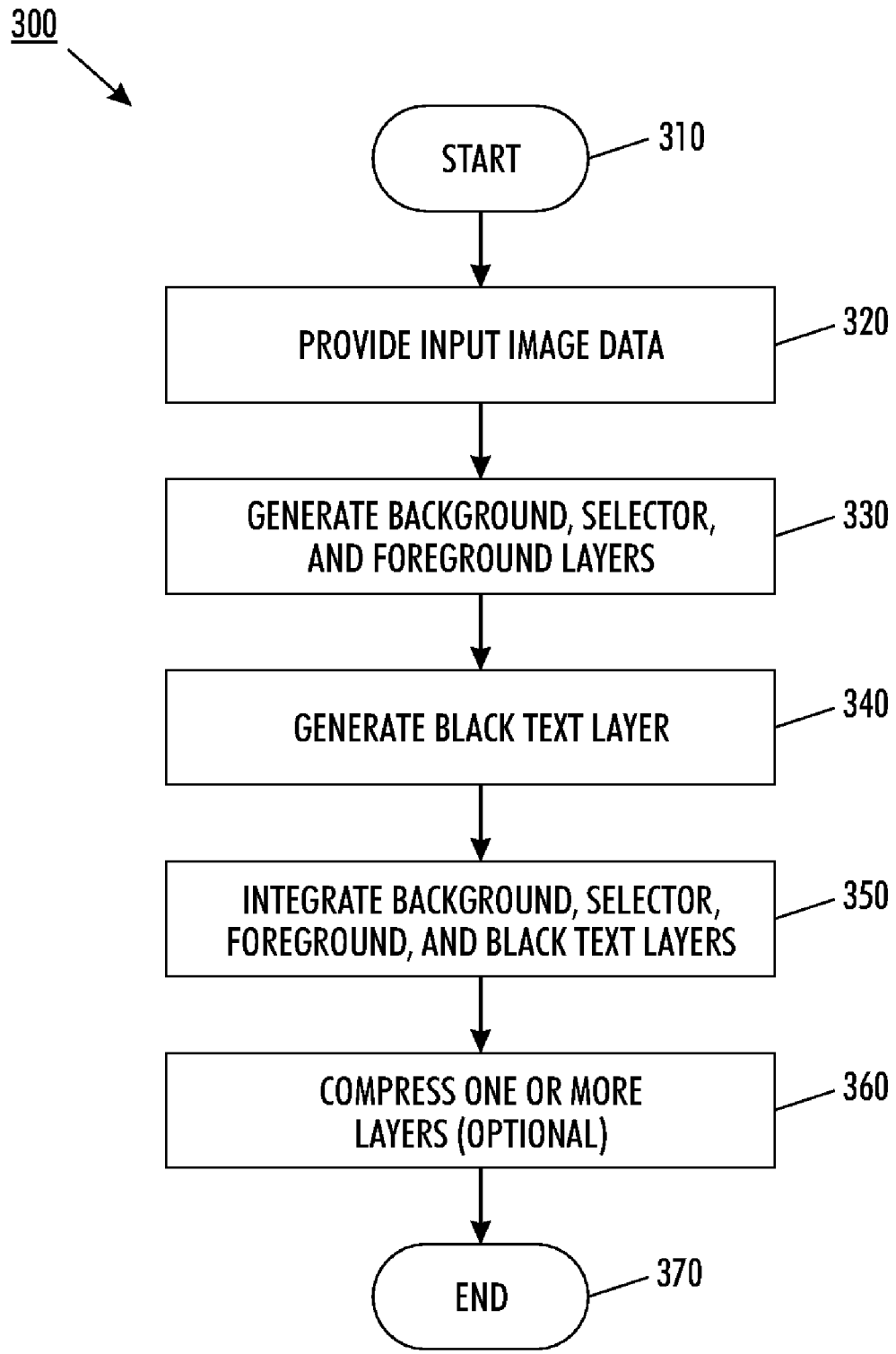
FIG. 3 shows an exemplary method for generating a 3+1 layer MRC data structure, according to one embodiment of this disclosure.

FIG. 3 shows an exemplary method 300 for generating a 3+1 layer MRC data structure having a black text layer, according to an embodiment of this disclosure.

The method begins in step 310. In step 320, input image data may be provided. For example, the input image data may include a digital file or an electronic image of a scanned document.

Next in step 330, an image segmentor may be used to produce three separate output layers from the input image data. These layers may include: the Background 210, the Selector 220, and the Foreground 230 layers. An exemplary image segmentor is described in U.S. Pat. No. 7,242,802, herein incorporated by reference in its entirety.

In step 340, the black text layer is generated. Black pixels may be identified from the same color input image data used for the other three layers in step 320. Next using one or more morphological operations pictorial area and non-text features may be identify and removed, so as to leave only black text. The black text pixel data may be assigned a predetermined value corresponding to the color black. In addition, noise reduction algorithms may also be applied. In some implementations, the order of steps 320 and 330 may be reversed.

Continuing to step 350, the black text layer 240 may be integrated with the background layer 210, selector layer 220 and foreground layer 230 to create the 3+1 layer MRC data structure 200.

In one embodiment, the JPEG 2000 image coding system (ISO/IEC 15444-6:2003) may be adapted for such purpose. JPEG 2000 provides for various layers of an object and permits each layer's attributes to be defined. For example, according to one aspect of the disclosure, the background layer 210 may be defined as layer0, the selector layer 220 defined as layer1, and the foreground layer 230 defined as layer2. The background layer 210 and the foreground layer 230 may be contone data while the selector layer may be binary. In addition, the black text layer 240 may be added as a layer3, which may be binary or contone.

The black text layer 240 may be associated with a color tag or color mask for a predetermined value corresponding to the color black. Table 1 shows one embodiment for the data structure for the 3+1 layer MRC data structure. Exemplary pixel data for each layer is shown in parenthesis.

TABLE 1

| |
|---|
| layer0: background layer (contone) |
| layer1: selector layer (binary) |
| layer2: foreground layer (contone) |
| Layer3: black text layer (binary or contone) |

In other implementations, contone compression models, such as, for example, JPEG or ISO/IEC 10918-1:1994, might similarly be adapted.

Pixels in each layer have a corresponding pixel in each of the other layers (and the input image data) which generally "match up" in location and/or position within the image. An active (ON) pixel indicates that the pixel is to be used in rendering the image. For binary data, an active pixel value may be 1. For contone image data, an active value may be some actual color value. By contrast, an inactive (OFF) pixel indicates that the pixel is not being used. For binary data, an inactive pixel value may be 0. For contone image data, an inactive pixel value may be a null or empty value.

According to one implementation, the 3+1 layer MRC data structure may be used with a digital computer or machine, such as a printer. For example, the data structure may be a digital file that includes computer- or machine-readable instructions to be executed by a processor to render or provide an image corresponding to the data file. The data file may be stored on or otherwise provided on a computer- or machine-readable storage media device (i.e., flash memory, DVD/CD ROM, floppy disk, removable or permanent hard drive, etc.).

Various software applications support viewing JPEG 2000 images. For example, Adobe® Acrobat® 7.0 may be used to view the 3+1 layer MRC data structure having the black text layer.

In step 360 one or more of the various layers of the 3+1 layer MRC data structure may be optionally compressed. For example, different compression schemes different may be used that optimally reduce the file size of a particular layer. In one implementation, a binary compression algorithm may be used for the black text layer 240. The method ends in step 370.

Figure 4:
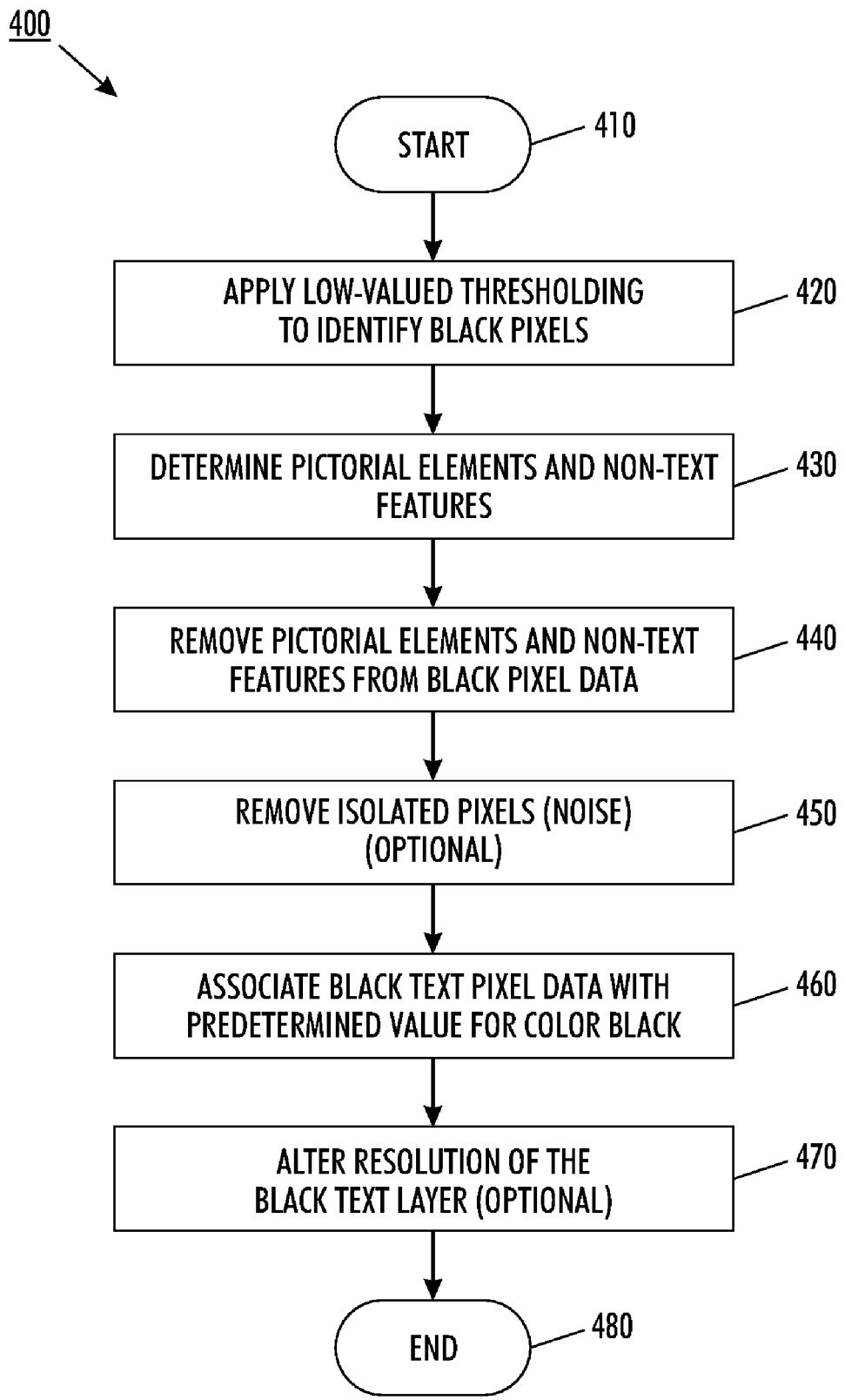
FIG. 4 shows an exemplary method for generating the black text layer, according to one embodiment of the application.

FIG. 4 shows an exemplary method 400 for generating a black text layer, according to one embodiment of this disclosure.

The method begins in step 410. In step 420, the full color input image data may be thresholded using a relatively low threshold value to identify black colored pixels.

In one embodiment, the threshold value may be close to the predetermined value for the color black. For example, this allows all the black pixels in the input image data to be retained, while the non-blacks from the input image data may be ignored.

The color black may be characterized by a low luminance level (e.g., approximately 0) and neutral chrominance values (e.g., about 128 for 8-bit data). Thus, the first step may be to identify pixels in the original input image data that may be black in color. For example, each pixel of the original input image data may be processed to generate a binary image data, with each "ON" (value=1) pixel in the binary image data satisfying the following criteria:
(1) $lum_j <$ lumThresh;
(2) absolute (chrom_$a_j$−128)<chromThresh; and
(3) absolute (chrom_$b_j$−128)<chromThresh.
where lum is the luminance value for a given pixel (i) from the original image and chrom_a and chrom_b are the respective chrominance values for that pixel.

The lumThreshold may be a relatively low value, for example, ranging form 0 to 80 for 8-bit data so as to capture low intensity pixels characteristic of the color black. In one implementation, lumThreshold may be 40. Similarly, the chromThresh may be a relatively low value to capture neutral pixels, for example, 5 for 8-bit data, so as to capture neutral color pixels also characteristic of the color black.

Next, in step 430 pictorial elements and/or non-text features may be identified in the binary image. In one embodiment, the binarized image obtained in step 410, representing black pixels, may be put through one or more morphological operations and connected component analysis to determine windows or connected objects from pictorial areas left in the image (as opposed to text).

In a morphological operation, the value of each pixel in the output image is based on a comparison of the corresponding pixel in the input image with its neighboring pixels defined by a window element (also known as a structural element). The window element may be an n×n array where n is any number greater than 2. Preferably, n may be greater than 7, for example, 9 to 11 for distinguishing text from non-text features.

Morphological operations generally include erosion and/or dilation steps. Various morphological operations, including erosion and dilation of a binary image, are disclosed, for example, in *Digital Image Processing* by Rafael C. Gonzalez and Richard E. Woods. (Addison-Wesley Publishing), reprinted 1993, pp. 518-564, herein incorporated by reference in its entirety.

In erosion, a certain contiguous pictorial element A may be shrunk by decreasing its periphery by the area of a window element B. Erosion may be defined mathematically according to equation (1) as follows:

$$A \ominus B = \{x | (B)_x \subseteq A\} \quad (1)$$

In dilation, the opposite occurs, with the contiguous region A being enlarged by increasing its periphery by the area of a window element B. Dilation may be defined mathematically according to equation (2) as follows:

$$A \oplus B = \{x | (\hat{B})_x \cap A \neq \emptyset\} \quad (2)$$

Dilation and erosion steps may be combined to provide image processing. For example, opening and closing processes may be used for such purposes. An opening process may include an erosion followed by a dilation. Opening may be used to smooth the contours of an image and break narrow isthmuses and/or eliminate thin protrusions. A closing may include a dilation followed by an erosion. Closing also smoothes the images, but by fusing narrow breaks and long thin gulfs, eliminating small holes, and filling gaps in contours. Other morphological operation might also be used such as Hit-or-Miss transforms to identify particular shapes.

A plurality of morphological operations may be subsequently preformed on the binary image to identify pictorial elements and non-text features. In one embodiment, a sequence of morphological operations may be applied, which includes: (i) erosion (9×9 window), (ii) dilation (9×9 window), (iii) erosion (11×11 window), and (iv) erosion (11×11 window). Of course, the sequence of morphological operations and/or windows may be tailored, so as to exclude various fonts, text sizes, and/or other features. Also, the windows used may be resolution dependent (i.e., the greater the resolution, the greater the sized window that is necessary to exclude text).

It will be appreciated that in other embodiments, other text-identifying algorithms may similarly be used.

Continuing to step 440, pictorial elements and/or other non-text features having been identified in step 430 may be subtracted from the binary image of step 420. The resultant binary image data generally corresponds to black text. This preferably is performed on a pixel-by-pixel basis.

In step 450, the black text image may optionally go through a noise removal process. The noise removal may be effective to remove isolated non-black text pixels from within text and/or to remove any isolated black text pixels that are surrounded by non-black text pixels that may remain.

For example, according to one implementation, a mask may be applied to the black text image data that looks for centrally isolated OFF (value=0) pixels in an n×n window where all of its neighboring pixels are ON (value=1), and if found, converts it to ON. In addition or alternatively, another mask be applied that looks for centrally isolated ON pixels in an n×n window where all of its neighborhood pixels are OFF, and if found, converts it to OFF. In one implementation, 3×3 masks may be used for each process, although it will be appreciated that other sized and/or different sized noise isolation masks may be applied.

Continuing to step 460, the black text pixel data may be assigned or otherwise associated with a predetermined ("true") color of black. In one implementation, the black text layer may be contone data, and each pixel may be assigned a predetermined value for the color of black (e.g., $LC_1C_2$=0, 128, 128 for 8-bit data). Conversely, non-black text may be assigned a predetermined color for white. (e.g., $LC_1C_2$=255, 128, 128 for 8-bit data). Thus, a "true" colored black text may be obtained for each black text pixel.

In another implementation, the black text layer may be binary data, with a binary mask associated with the predetermined value for the color black. Thus, ON pixels may be associated with a "true" colored black text.

In step 470, the resolution of the black text layer may optionally be altered from that of the input image data to produce better quality text. For example, for a 300 dpi original image the black text layer may be scaled up by a factor to give a 600 dpi black text layer. Thus, the black text quality may be greatly improved without a significant increase in the file size. In general, the background layer 210, selector layer 220, foreground layer 230, black text layer 240, and optionally other layers may all have different resolutions. Indeed, they are not required to maintain the resolution of the original input image data. The method ends in step 480.

Figure 5:
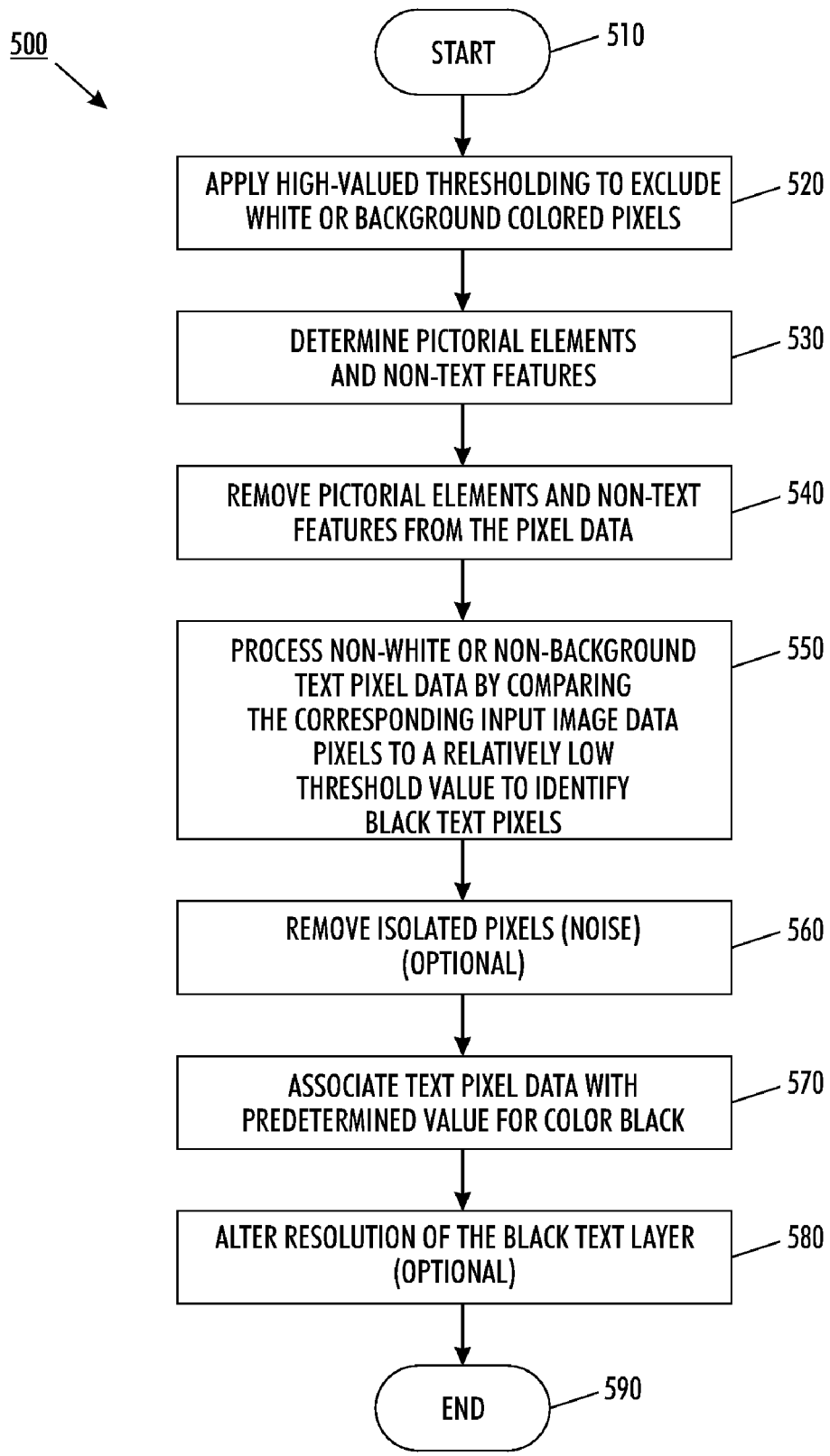
FIG. 5 shows another exemplary method for generating the black text layer, according to one embodiment of the application.

FIG. 5 shows another exemplary method 500 for generating of a black text layer, according to one embodiment of this disclosure.

In this embodiment, the input image data may first be subjected to a high value thresholding process. For example, the threshold may be close to the predetermined value for the color white or the background color value of the image. This allows all the non-white or non-background pixels in the input image data to be retained, while the white or background colored pixels from the input image data may be exclude.

In some circumstances, this methodology may be more effective for handling certain documents, such as "Mixed Documents," which contain both pictorial elements as well as text components.

The method begins in step 510. In step 520, the full color input image data may be thresholded using a relatively high threshold value to exclude white pixels.

The color white may be characterized by a high luminance level (e.g., approximately 255) and neutral chrominance values (e.g., about 128 for 8-bit data). Thus, the first step may be to identify pixels in the original input image data that may be white in color. For example, each pixel of the original input image data may be processed to generate a binary image data, with each "OFF" (value=0) pixel in the binary image data satisfying the following criteria:

(1) $lum_j$>lumThresh;
(2) absolute $(chrom\_a_j-128)$<chromThresh; and
(3) absolute $(chrom\_b_j-128)$<chromThresh.
where lum is the luminance value for a given pixel (i) from the original image and chrom_a and chrom_b are the respective chrominance values for that pixel.

The lumThreshold may be a relatively high value, for example, 220 for 8-bit data, so as to remove high intensity pixels characteristic of the color white. Similarly, the chromThresh may be a relatively low value to remove neutral white pixels, for example, 5 for 8-bit data, so as to remove almost neutral pixels also characteristic of the color white.

In addition or as an alternative to using the color white as a threshold, the background value of the image could also be used for thresholding. For example, many office documents may have near-white backgrounds. In one embodiment, the background values of the documents may be determined using existing background detection algorithms, such as described in U.S. Pat. Nos. 6,198,845; 6,674,899; and 7,058,222, herein incorporated by reference in their entirety.

Next, in step 530 pictorial elements and/or non-text features may be identified in the binary image. In one embodiment, the binarized image obtained in step 510, representing non-white or non-background pixels, may be put through one or more morphological operations and connected component analysis to determine windows or connected objects from pictorial areas left in the image (as opposed to text), as discussed above. It will also be appreciated that in other embodiments, other text-identifying algorithms may similarly be used.

Continuing to step 540, pictorial elements and/or other non-text features having been identified in step 530 may be subtracted from the binary image of step 520. The resultant binary image data generally corresponds to text, with each "ON" (value=1) in the binary text image data corresponding to text pixels. This preferably is performed on a pixel-by-pixel basis.

In step 550, the non-white or non-background text pixel data from step 540 maybe processed by comparing the corresponding input image data pixels (input to step 520) to a relatively low threshold value to identify black text pixels in the non-white or non-background text pixel data. In one embodiment, active (ON) pixels in the non-white or non-background text pixel data in which its corresponding input image data satisfies a predetermined criteria will remain active (ON) while those that do not will be made inactive (OFF).

For example, for each "ON" pixel of the binary text image data, the corresponding pixel of the full color input image data will be compared to a relatively low threshold value to generate a black text image data, with each "ON" (value=1) pixel in the resultant binary black text image data satisfying the following criteria:

(1) $lum_j$<lumThresh;
(2) absolute ($chrom\_a_j$−128)<chromThresh; and
(3) absolute ($chrom\_b_j$−128)<chromThres.

where lum is the luminance value for a given pixel (i) from the original (full color input) image data and chrom_a and chrom_b are the respective chrominance values for that pixel.

The lumThreshold may be a relatively low value, for example, 40 for 8-bit data, so as to capture low intensity pixels characteristic of the color black. Similarly, the chromThresh may be a relatively low value to capture neutral black pixels, for example, 5 for 8-bit data, so as to capture almost neutral pixels also characteristic of the color black.

In step 560, the black text image may optionally go through a noise removal process. The noise removal may be effective to remove isolated non black text background pixels (i.e., "white") pixels from within black text and/or to remove any isolated black text pixels that are surrounded by non-black text pixels that may remain.

For example, according to one implementation, a mask may be applied to the binary black text image data that looks for centrally isolated. OFF (value=0) pixels in an n×n window where all of its neighboring pixels are ON (value=1), and if found, converts it to ON. In addition or alternatively, another mask be applied that looks for centrally isolated ON pixels in an n×n window where all of its neighborhood pixels are white, and if found, converts it to OFF. In one implementation, 3×3 masks may be used for each process, although it will be appreciated that other sized and/or different sized noise isolation masks may be applied.

Continuing to step 570, the black text pixel data may then be assigned or otherwise associated with a predetermined ("true") color of black. In one implementation, the black text layer may be contone data, and each pixel may be assigned a predetermined value for the color of black (e.g., $LC_1C_2$=0, 128, 128 for 8-bit data). Conversely, non-black text may be assigned a predetermined color for white (e.g., $LC_1C_2$=255, 128, 128 for 8-bit data). Thus, a "true" colored black text may be obtained for each black text pixel.

In another implementation, the black text layer may be binary data, with a binary mask associated with the predetermined value for the color black. Thus, ON pixels may be associated with a "true" colored black text.

In step 580, the resolution of the black text layer may optionally be altered from that of the input image data to produce better quality text. For example, for a 300 dpi original image the black text layer may be scaled up by a factor to give a 600 dpi black text layer. Thus, the black text quality may be greatly improved without a significant increase in the file size. In general, the background layer 210, selector layer 220, foreground layer 230, black text layer 240, and optionally other layers may all have different resolutions. Indeed, they are not required to maintain the resolution of the original input image data. The method ends in step 590.

Figure 6:
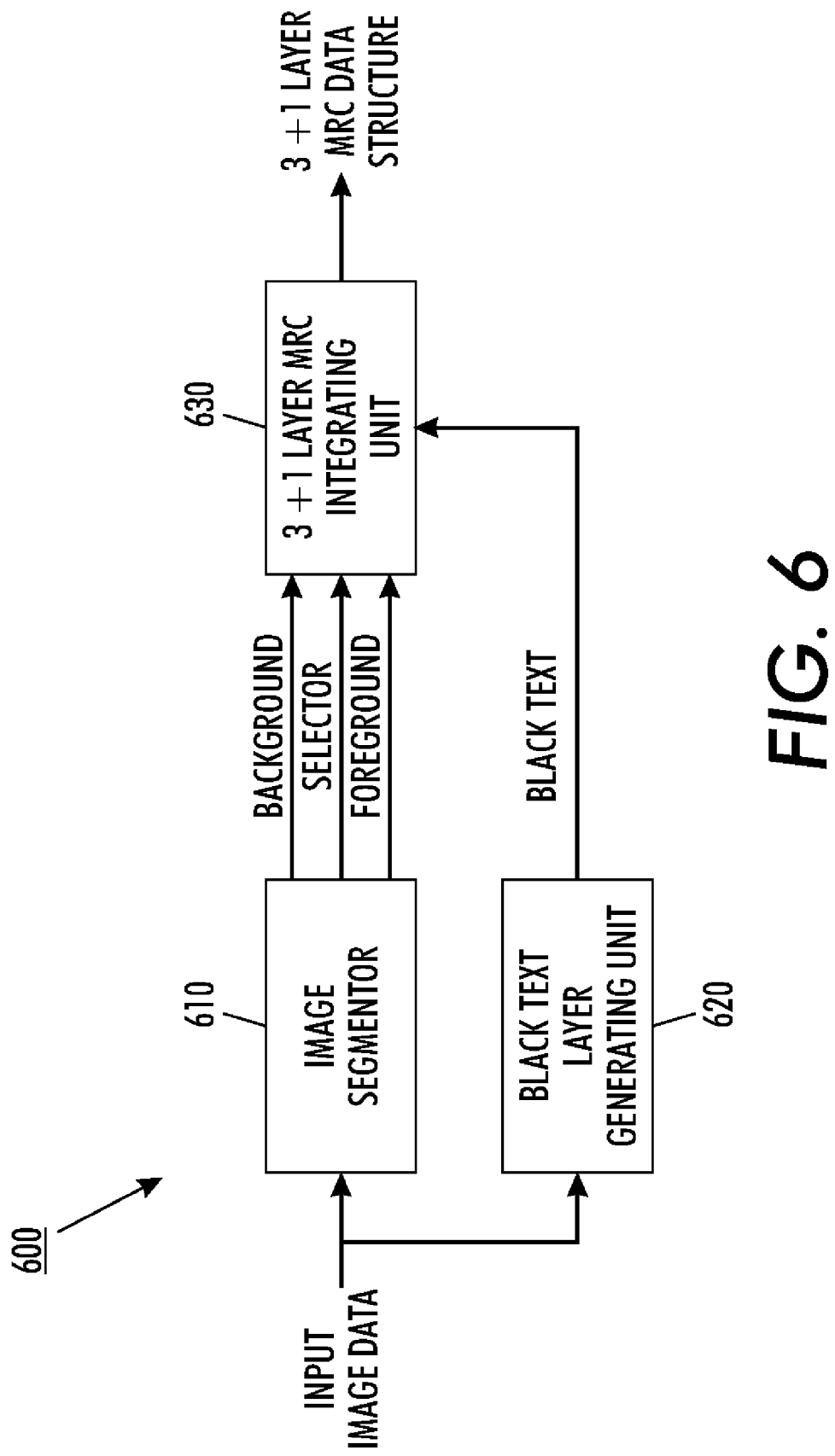
FIG. 6 shows an exemplary system for processing image data, according to one embodiment of this application.

FIG. 6 shows an exemplary system 600 for generating a 3+1 layer MRC data structure, according to one embodiment of this application.

The system 600 generally includes an image segmentor 610, a black text generating unit 620 and a 3+1 layer MRC integrating unit 630.

In some implementations, the functionality of the various components of the system 600 may be combined, and/or additional components may be provided.

Input image data may be received by the system 600 through an interface (I/F). In some implementations, the interface may be connected to a network, a memory device, or machine (e.g., a scanner) to receive input image data.

The image segmentor 610 may be configured to receive input image data and produce background layer data, selector layer data, and foreground layer data. As noted above, in one embodiment, the background and foreground layers data may be contone image data, while the selector layer data may be binary. Various image segmentors may be used, for example, as disclosed in U.S. Pat. No. 7,242,802, mentioned above.

The black text layer generating unit 620 may be configured to generate black text from the input image layer. The black text may be binary and assigned or otherwise associated with a predetermined value for the color black.

The 3+1 layer MRC integrating unit 630 may be configured to integrate the output of the image segmentor 610 and the black text layer generating unit 620 to produce a 3+1 MRC layer data structure (FIG. 2). In some implementations, the integrating unit 620 may alter the resolution of and/or compress one or more layers of the resultant data structure to be different from that of the input image data.

The output of the system 600 may be connected to a memory device, network, other devices, or combinations thereof.

The system 600 disclosed herein may include dedicated hardware like ASICs or FPGAs, software (firmware), or a combination of dedicated hardware and software. For the different applications of the embodiments disclosed herein, the programming and/or configuration may vary. The system may, in some embodiments, be incorporated, for example, into a dynamic threshold module of a scanner.

In addition, the systems and methods for creating and/or processing the 3+1 layer MRC data structure may be software, for example, applications having computer or machine-executable instructions, created using any number of programming languages (e.g., Ada, C++, Java, etc.). Of course, it will be appreciated that any number of hardware implementations, programming languages, and operating platforms may be used. As such, the description or recitation of any specific hardware implementation, programming language, and operating platform herein is exemplary only and should not be viewed as limiting.

Alternatively, or additionally, the application may be a stand-alone application running on a computer which interfaces with a printing system, for example, through a remote network connection, or via a computer-readable storage media. In some implementations, the applications may be a "plug-in" application that is incorporated into a third-party software application including, for example, document-processing or image production applications. Other configurations may be also implemented.

While this disclosure has been described in connection with what is presently considered to be the most practical and preferred embodiment, it is to be understood that it is capable of further modifications and is not to be limited to the disclosed embodiments, and this disclosure is intended to cover any variations, uses, equivalent arrangements or adaptations of the inventive concepts following, in general, the principles of the disclosed embodiments and including such departures from the present disclosure as come within known or customary practice in the art to which the embodiments pertains, and as may be applied to the essential features hereinbefore set forth and followed in the spirit and scope of the appended claims.

What is claimed is:

1. A method for processing image data, comprising using a processor to perform:
    providing input image data;
    segmenting the input image data to generate:
        a background layer representing the background attributes of an image;
        a selector layer for identifying one or more foreground attributes of the image not included in the background layer; and
        a foreground layer representing the foreground attributes of the image;
    generating a black text layer comprising pixel data representing black text in the input image data;
    assigning the black text pixel data a predetermined value for the color black; and
    integrating the background layer, the selector layer, the foreground layer, and the black text layer into a data structure having machine-readable instructions that may be stored in a memory device.

2. The method according to claim 1, wherein generating the black text layer further comprises:
    performing low-value thresholding on the input image data to identify black colored pixels;
    determining pictorial elements and/or non-text features from the black pixel data; and
    removing the pictorial features and/or non-text features from the black pixel data to provide black text pixel data.

3. The method according to claim 2, wherein generating the black text layer further comprises:
    performing high-value thresholding on the input image data to exclude white or background colored pixels;
    determining pictorial elements and/or non-text features from the non-white or non-background pixel data;
    removing-the pictorial features and/or non-text features from the non-white or non-background pixel data to provide non-white or non-background text pixel data; and
    processing the non-white or non-background text pixel data by comparing the corresponding input image data pixels to a relatively low threshold value to identify black text pixels.

4. The method according to claim 2 or claim 3, wherein determining pictorial elements and/or non-text features further comprises:
    performing one or more morphological operations.

5. The method according to claim 4 wherein the one or more morphological operations comprise at least one erosion operation and/or at least one dilation operation.

6. The method according to claim 1, further comprising using a processor to perform:
    removing isolated pixels from the black text pixel data.

7. The method according to claim 1, wherein the black text layer comprises one of binary pixel data or contone pixel data.

8. The method according to claim 1, further comprising using a processor to perform:
    compressing one or more of the background layer, the selector layer, the foreground layer, or the black text layer.

9. The method according to claim 1, further comprising using a processor to perform:
    altering the resolution of the black text pixel data to be different from the input image data.

10. A system for processing image data comprising:
    an image segmentor configured to receive image data and to generate
        a background layer representing the background attributes of an image;
        a selector layer for identifying one or more foreground attributes of the image not included in the background layer; and
        a foreground layer representing the foreground attributes of the image;
    a black text layer generating unit configured to determine pixel data representing black text in the input image data and to assign a predetermined color of black to the black text pixel data; and
    an integrating unit configured to integrate the background layer, the selector layer, the foreground layer, and the black text layer into a data structure having machine-readable instructions that may be stored in an memory device.

11. The system according to claim 10, wherein the black text layer generating unit is configured to:
    perform low valued thresholding on the input image data to identify black colored pixels;
    determine pictorial elements and/or non-text features from the black pixel data; and
    remove the pictorial features and/or non-text features from the black pixel data to provide black text pixel data.

12. The system according to claim 10, wherein the black text layer generating unit is configured to:
    perform high-value thresholding on the input image data to exclude white or background colored pixels;
    determine pictorial elements and/or non-text features from the non-white or non-background pixel data;
    remove the pictorial features and/or non-text features from the non-white or non-background pixel data to provide non-white or non-background text pixel data; and
    process the non-white or non-background text pixel data by comparing the corresponding input image data pixels to a relatively low threshold value to identify black text pixels in the non-white or non-background text pixel data.

13. The system according to claim 11 or claim 12, wherein in determining pictorial elements and/or non-text features, the black text layer generating unit is further configured to perform one or more morphological operations.

14. The system according to claim 13 wherein the one or more morphological operations comprise at least one erosion operation and/or at least one dilation operation.

15. The system according to claim 10, wherein the black text layer generating unit is further configured to remove isolated pixels from the black text pixel data.

16. The system according to claim 10, wherein the black text layer comprises binary pixel data or contone pixel data.

17. The system according to claim 10, wherein the black text layer generating unit is further configured to alter the resolution of the black text pixel data to be different from the input image data.

18. The system according to claim 10, wherein the black text layer generating unit is further configured to compress one or more of the background layer, the selector layer, the foreground layer, or the black text layer.

* * * * *